(12) United States Patent
Akiba

(10) Patent No.: US 12,419,285 B2
(45) Date of Patent: Sep. 23, 2025

(54) REEL SEAT

(71) Applicant: GLOBERIDE, Inc., Tokyo (JP)

(72) Inventor: Masaru Akiba, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 135 days.

(21) Appl. No.: 17/693,859

(22) Filed: Mar. 14, 2022

(65) Prior Publication Data

US 2023/0019517 A1    Jan. 19, 2023

(30) Foreign Application Priority Data

Jul. 15, 2021   (JP) ................................. 2021-117133

(51) Int. Cl.
*A01K 87/06*    (2006.01)
(52) U.S. Cl.
CPC .................................. *A01K 87/06* (2013.01)
(58) Field of Classification Search
CPC .... A01K 87/06; A01K 87/008; A01K 87/009; A01K 89/0179; A01K 89/0123; F41G 1/18
See application file for complete search history.

(56) References Cited

U.S. PATENT DOCUMENTS

| | | | | |
|---|---|---|---|---|
| 4,943,012 A | * | 7/1990 | Aoki ................... | A01K 89/0155 242/321 |
| 5,149,007 A | * | 9/1992 | Saito .................... | A01K 89/027 242/246 |
| 5,149,009 A | * | 9/1992 | Sato .................... | A01K 89/0155 242/306 |
| 5,192,036 A | * | 3/1993 | Sato ...................... | A01K 89/033 242/268 |
| 5,358,196 A | * | 10/1994 | Kawabe ............... | A01K 89/027 242/246 |

(Continued)

FOREIGN PATENT DOCUMENTS

| | | | |
|---|---|---|---|
| CN | 220436343 U | * | 2/2024 |
| JP | S58182677 U | * | 12/1983 |

(Continued)

OTHER PUBLICATIONS

CN 220436343 U Translation (Year: 2024).*

(Continued)

*Primary Examiner* — Katelyn T Truong
(74) *Attorney, Agent, or Firm* — Oliff PLC

(57) ABSTRACT

A reel seat of the present disclosure has a seat body including a reel leg placing portion and a tubular portion formed with an opening hole that a rear end portion of a rod is fitted in and fixed to. The seat body includes a floating hood moving in an axial direction to fix a reel leg on the reel leg placing portion, a nut member fitted in the floating hood to move the floating hood in the axial direction with the floating hood whirl-stopped, and a click mechanism provided in a fitting region between the floating hood and the nut member. The click mechanism includes a recess-and-projection formed on an inner peripheral surface of the nut member and produces click sound, and an arc-shaped recessed portion formed on an outer peripheral surface of the floating hood to install a plate spring therein. The plate spring has a top portion engaged with the recess-and-projection.

7 Claims, 10 Drawing Sheets

(56) References Cited

U.S. PATENT DOCUMENTS

| | | | |
|---|---|---|---|
| 5,518,194 A * | 5/1996 | Jeung | A01K 89/01 242/282 |
| 5,544,832 A * | 8/1996 | Okamoto | A01K 89/027 242/246 |
| 5,564,640 A * | 10/1996 | Egasaki | A01K 89/027 242/246 |
| 5,692,692 A * | 12/1997 | Zwayer | A01K 89/0102 242/244 |
| 5,740,975 A * | 4/1998 | Cho | A01K 89/0275 242/244 |
| 6,398,141 B1 * | 6/2002 | Kim | A01K 89/0155 242/303 |
| 2002/0020103 A1 | 2/2002 | Yamamoto et al. | |
| 2003/0146320 A1 * | 8/2003 | Yamaguchi | A01K 89/027 242/246 |

FOREIGN PATENT DOCUMENTS

| | | | | |
|---|---|---|---|---|
| JP | S5942169 U | * | 3/1984 | |
| JP | S61173271 U | * | 10/1986 | |
| JP | 2000041541 A | * | 2/2000 | A01K 87/06 |
| JP | 2000342123 A | | 12/2000 | |
| JP | 2001145439 A | | 5/2001 | |
| JP | 3688218 B2 | | 8/2005 | |
| JP | 4004000 B2 | | 11/2007 | |
| JP | 4400839 B2 | | 1/2010 | |
| KR | 20-0227108 U | | 6/2001 | |
| KR | 20190021683 A | * | 9/2004 | |
| KR | 200361647 Y1 | * | 8/2006 | |
| KR | 200423033 Y1 | * | 2/2014 | |
| KR | 200471310 Y1 | * | 3/2019 | |
| TW | 546116 B | | 8/2003 | |
| WO | WO-2019026384 A1 | * | 2/2019 | |

OTHER PUBLICATIONS

KR 20190021683 A Translation (Year: 2019).*
WO 2019026384 A1 Translation (Year: 2019).*
KR 200423033 Y1 Translation (Year: 2006).*
KR 200361647 Y1 Translation (Year: 2004).*
Office Action in connection with related Singaporean Patent Application No. 10202202316W; action dated Mar. 15, 2023; (11 pages).
Office Action for related Taiwanese Application No. 111104843; action dated Dec. 14, 2022; (10 pages).
Examination Report for related Australian Application No. 2022201598; action dated Jun. 16, 2023; (6 pages).
Feb. 8, 2024 Office Action issued in Australian Patent Application No. 2022201598.
Mar. 7, 2024 Office Action issued in Japanese Application No. 2021-117133.
Jun. 7, 2024 Examination Report issued in Australian Application No. 2022201598.
Aug. 26, 2024 Notice of Preliminary Rejection issued in Korean Patent Application No. 10-2022-0085424.
Apr. 30, 2024 Office Action issued in Australian Patent Application No. 2022201598.
Jul. 25, 2024 Office Action issued in Singaporean Patent Application No. 10202202316W.
Mar. 28, 2025 Office Action issued in Chinese Application No. 202210434841.8.
Jun. 16, 2025 Office Action issued in Australian Application No. 2024204053.

* cited by examiner

A-A

REEL SEAT

CROSS-REFERENCE TO RELATED APPLICATIONS

This application claims priority under 35 U.S.C. § 119 to Japanese Patent Application No. 2021-117133 filed on Jul. 15, 2021, in the Japanese Patent Office, the entire contents of each hereby incorporated by reference.

FIELD

The present disclosure relates to a reel seat that is attached to various fishing rods, each of which a reel is mounted on, and is used for mounting and fixing the reel, and more particularly, to a reel seat that produces click sound when a floating hood is moved.

BACKGROUND

Conventionally, it has been known to fix a tubular reel seat to an outer peripheral surface of a root rod of a fishing rod using a reel. In general, such a reel seat has a structure in which a fixed hood is provided on one end side in an axial direction of a reel leg placing portion and a floating hood is provided on another end side in the axial direction. The floating hood is whirl-stop-engaged with a nut member, and the floating hood is moved closer to/away from the fixed hood by rotationally operating the nut member.

As the reel seat having the above-described structure, there is known a reel seat provided with a click mechanism that produces a crack sound when the nut member is rotationally operated. For example, JP 2000-342123 A discloses a click mechanism in which a support member to which a plate spring is attached is disposed between a nut member and a reel seat, and JP 2001-145439 A discloses a click mechanism in which a support member to which a coil spring and a ball part are attached is disposed between a nut member and a reel seat. In any of the configurations, recess-and-projections in which the plate spring and the ball part are resiliently engaged are formed on an inner surface of the nut member over a circumferential direction, and click sound is produced by rotationally operating the nut member.

SUMMARY

Since the conventional click mechanism has the structure in which the support member for attaching a resilient member is disposed between the nut member and the reel seat, an outer diameter of the floating hood is increased, appearance is deteriorated, and the click mechanism is functionally not preferable. In this case, in order to reduce the outer diameter of the floating hood, it is necessary to reduce a screw outer diameter, so that a usable range is limited. In addition, in the structure in which the ball part is biased by the coil spring, a number of parts is large, a cost is high, the structure is unstable, so that a failure or the like easily occurs.

The present disclosure has been made in view of the above problems, and an object of the present disclosure is to provide a reel seat incorporating a click mechanism that produces click sound with a simple structure without increasing outer diameters of a floating hood and a nut member.

In order to the above-described object, a reel seat according to the present disclosure has a seat body including a reel leg placing portion on which a reel leg of a fishing reel is placed, and a tubular portion formed with an opening hole that a rear end portion of a rod is fitted in and fixed to, wherein the seat body includes a floating hood that moves in an axial direction and fixes the reel leg placed on the reel leg placing portion, a nut member that is fitted in the floating hood so as to move the floating hood in the axial direction in a state where the floating hood is whirl-stopped, and a click mechanism provided in a fitting region between the floating hood and the nut member, and the click mechanism includes a recess-and-projection that is formed on an inner peripheral surface of the nut member and produces click sound, and a recessed portion that has an arc shape and is formed on an outer peripheral surface of the floating hood, wherein a plate spring having a top portion engaged with the recess-and-projection is provided (installed).

The click mechanism of the reel seat described above is provided in the fitting region between the floating hood and the nut member, and the click mechanism includes the plate spring having the top portion that engages with the recess-and-projection formed on the inner peripheral surface of the nut member. Since this plate spring is configured to be provided (installed) in the arc-shaped recessed portion formed in the outer peripheral surface of the floating hood in the fitting region, it is not necessary to separately provide a support member as in the related art, and since this is configured to produce the click sound by the resiliency of the plate spring provided (installed) in the recessed portion, the structure is simple, and outer diameters of the floating hood and the nut member are not increased.

The reel seat having the above-described configuration can be fixed to an outer peripheral surface of a rod (root rod) of each of various fishing rods.

According to the present disclosure, it is possible to obtain a reel seat incorporating a click mechanism that produces click sound with a simple structure without increasing outer diameters of a floating hood and a nut member, and a fishing rod to which such a reel seat is attached.

BRIEF DESCRIPTION OF THE DRAWINGS

FIGS. 2A and 2B are exploded perspective views of the reel seat portion shown in FIG. 1, in which FIG. 2A is a view as viewed from above, and FIG. 2B is a view as viewed from below;

FIGS. 3A and 3B show a nut member configuring the reel seat, in which FIG. 3A is a cross-sectional view in the axial direction, and FIG. 3B is a cross-sectional view taken along line A-A of FIG. 3A;

FIGS. 4A to 4C show a floating hood configuring the reel seat, in which FIG. 4A is a cross-sectional view in the axial direction, FIG. 4B is a plan view, and FIG. 4C is a view as viewed from a front side in the axial direction;

FIGS. 5A and 5B are views showing a configuration of a plate spring to be installed in the floating hood, in which FIG. 5A is a front view and FIG. 5B is a side view;

FIGS. 6A and 6B are views showing a state where the nut member is fitted in the floating hood (a structure of a click mechanism), in which FIG. 6A is a view sowing a state where a top portion of the plate spring is engaged with a recess by rotating the nut member, and FIG. 6B is a view showing a state where a top portion of the plate spring is engaged with a projection; and FIGS. 7A and 7B are views showing a modification of the click mechanism, in which FIG. 7A is a view showing a state where the top portion of the plate spring is located in the recess by rotating the nut member, and FIG. 7B is a view showing a state where the top portion of the plate spring is engaged with the projection.

DETAILED DESCRIPTION

Figure 1:
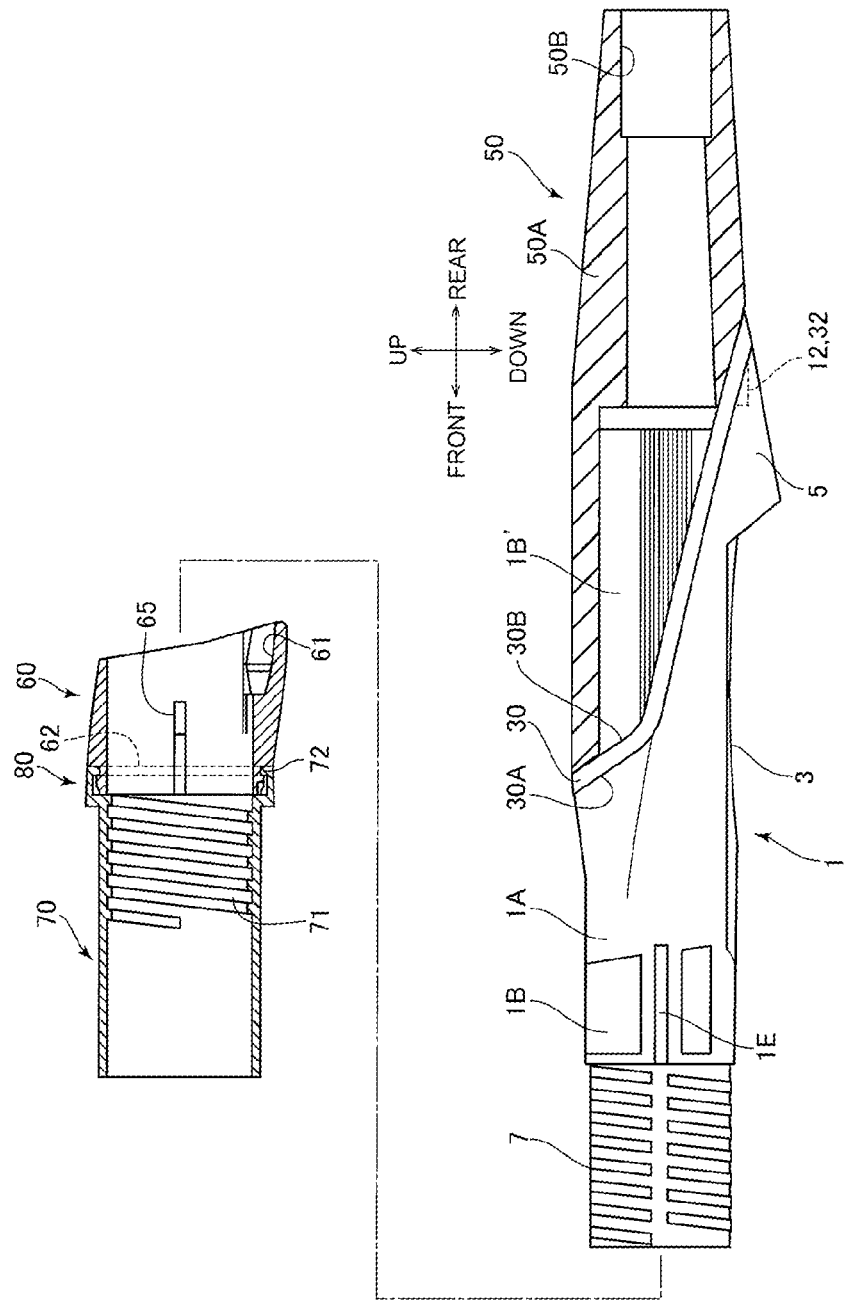
FIG. 1 is a partial cross-sectional view in an axial direction showing one embodiment of a reel seat according to the present disclosure.
Figure 2A:
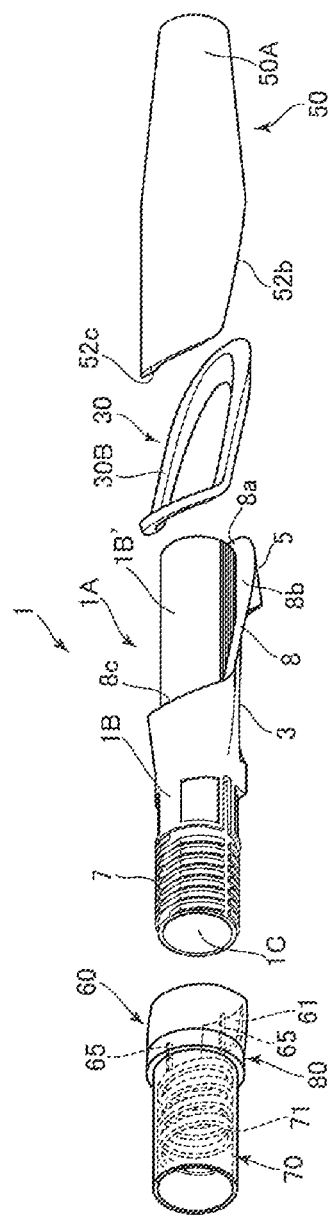
Figure 2B:
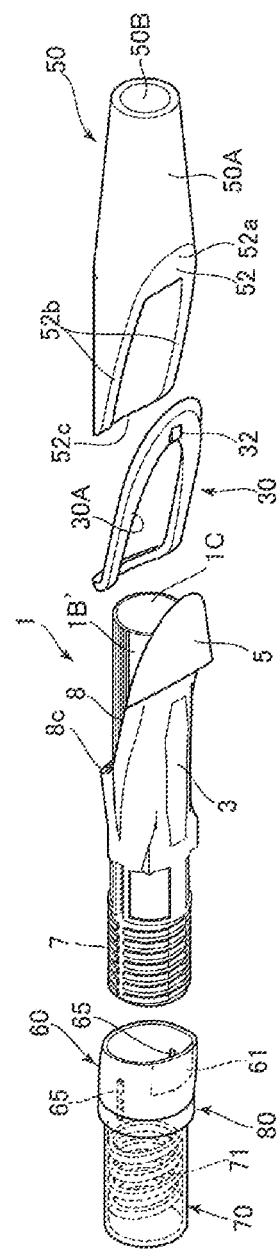

Hereinafter, an embodiment of a reel seat according to the present disclosure will be specifically described with reference to the accompanying drawings.

FIGS. 1 to 6B are side views showing one embodiment of the reel seat according to the present disclosure. In the following description, a front-rear direction (axial direction) and an up-down direction mean directions shown in FIG. 1, and a right-left direction (side direction) means a direction orthogonal to a paper surface of FIG. 1. The reel seat of the present embodiment has a structure (variant grip (variant-shaped grip) structure) suitable for a fishing rod to which a spinning reel is attached, and the reel is mounted on a lower side. In addition, although the fishing rod fixed to the reel seat is not illustrated, a rear end portion of the rod (root rod) is fitted in the axial direction through an opening hole of the reel seat and fixed by adhesion or the like. A configuration of this fishing rod is not limited, and a telescopic type, a jointed type, a single rod, or like may be adopted.

A seat body 1A of a reel seat 1 according to the present embodiment is integrally formed of a material having transparency, for example, nylon, polycarbonate, acryl, urethane, or the like so as to improve designability, and is configured to be visible to an inside. A color of the material may be colorless and transparent, or may be a chromatic color, and a transmittance is not limited as long as the inside can be visually recognized. In addition, the configuration may be such that the seat body 1A is partially color-coded or partially different in transmittance. Alternatively, it may be formed of an untransparent material.

The seat body 1A is formed in a tubular shape as a whole, a base end side of a rod (root rod) configuring the fishing rod is inserted into an opening hole 1C formed in a tubular portion 1B and penetrating in the front-rear direction, and an outer peripheral surface thereof is fixed by adhesion or the like. In this case, the base end side of the rod may be directly fixed to an inner peripheral surface of the opening hole 1C, or may be fixed with a tubular spacer interposed therebetween.

A tubular grip 50 to be gripped and held is integrated with the seat body 1A. In addition, the grip 50 is attached to a rear side of the seat body 1A, and a body 50A of the grip 50 can be formed of a soft material such as, for example, natural cork, urethane, EVA, thermoplastic elastomer, rubber, or the like that can improve feeling when the grip 50 is gripped, grip performance, and appearance, and can reduce weight, or can be formed by coating one of these materials to a hard member. The grip 50 is integrated with the seat body 1A via a cover member described later, and when both are integrated, an opening hole 50B penetrating the body 50A in the front-rear direction is coaxial with the opening hole 1C of the seat body 1A, and the base end side of the rod is inserted and fixed. In this case, the base end side of the inserted rod may be directly fixed to the inner peripheral surface of the opening hole 50B, or may be fixed with a tubular spacer interposed therebetween.

The seat body 1A is provided with a reel leg placing portion 3 on which a reel leg of the spinning reel is placed, and a fixed hood 5 that is disposed on a rear side of the reel leg placing portion 3 and receives a rear end side of the reel leg. In the seat body 1A, a floating hood 60, a nut member 70 fitted to the floating hood so as to move the floating hood 60 in the axial direction in a whirl-stop state, and a click mechanism 80 provided in a fitting region between the floating hood 60 and the nut member 70 are disposed on a front side in the axial direction opposite to the fixed hood 5. That is, on the front side of the seat body 1A (front side of the reel leg placing portion 3), the floating hood 60 that is opposed to the fixed hood 5 and can move forward and backward in the axial direction is disposed.

The floating hood 60 moves in the axial direction without rotating by rotationally operating the nut member 70 screwed to a male screw portion 7 formed at a front end portion of the tubular portion 1B, and tightens and fixes a front end side of the leg portion of the spinning reel placed on the reel leg placing portion 3. Therefore, the floating hood 60 includes a hood portion 61 that moves in the axial direction and receives the front end side of the reel leg. A fitting structure of the floating hood 60 and the nut member 70, and a configuration of the click mechanism 80 will be described later.

An end surface (connection end surface) 52 of the grip 50 is disposed on an end surface (connection end surface) 8 on a grip side of the seat body 1A so as to face the end surface 8, and the end surface 8 and the end surface 52 are integrated with a cover member 30 interposed therebetween. In this case, the reel seat 1 and the grip 50 of the present embodiment are configured as a variant grip (variant-shaped grip) in which a part of the grip in the axial direction is disposed so as to overlap the seat body 1A of the reel seat, which improves appearance. Specifically, the seat body 1A is formed so as to protrude rearward in a state where the tubular portion 1B is exposed, and the connection end surface 8 inclined from the lower side to an upper side is formed along an outer peripheral surface of an exposed protruding portion (hereinafter, referred to as an exposed protruding portion 1B).

The connection end surface 8 is configured as a step portion protruding outward along the outer peripheral surface of the exposed protruding portion 1W, and includes a protruding step portion 8a protruding in a substantially semicircular shape in the axial direction at a lower end position of the exposed protruding portion 1B', both-side inclined step portions 8b formed so as to gradually rise toward the front side on both sides of the protruding step portion 8a, and an upper protruding step portion 8c formed so as to be continuous with the both-side inclined step portions 8b at an upper end position of the exposed protruding portion 1B'. The connection end surface 8 including the protruding step portion 8a, the both-side inclined step portions 8b, and the upper protruding step portion 8c described above is configured as an abutting surface exposed toward the rear side, and the cover member 30 is brought into close surface contact with this abutting surface. The fixed hood 5 is integrated with lower sides of the both-side inclined step portions 8b from a lower surface of the protruding step portion 8a.

The connection end surface 52 on the connection side of the body 50A of the grip 50 is cut so as to be inclined downward from an upper end in a connection region on a seat body side, and a cut surface thereof includes a lower end surface 52a, both-side inclined end surfaces 52b, and an upper end surface 52c so as to face the protruding step portion 8a, the both-side inclined step portions 8b, and the upper protruding step portion 8c of the seat body 1A. These surfaces face one another with the cover member 30 interposed therebetween by fitting the exposed protruding portion 1B' of the seat body 1A into the opening hole 50B on a front side of the grip 50.

When the exposed protruding portion 1B' of the seat body 1A is fitted into the opening hole 50B on the front side of the grip 50, the cover member 30 is interposed therebetween. The cover member 30 has a ring-shaped frame structure extending in the axial direction and the up-down direction and having a front side bent and raised, and is formed of a non-transparent material. In a state where the above-described cover member 30 is interposed between the seat body 1A and the grip 50, surfaces of the seat body 1A, the cover member 30, and the grip 50 are substantially flush with one another, so that the seat body 1A, the cover member 30, and the grip 50 are easily gripped without unevenness on the surfaces. The cover member 30 can be integrally formed of, for example, resin, metal, wood, or the like, and the surface thereof may be provided with a color or a pattern, or may be plated with metal such as gold, silver, copper, or aluminum so as to have brightness. As described above, the thin linear cover member 30 is exposed at a boundary portion between the seat body 1A and the grip 50, so that the designability can be enhanced.

One surface (seat facing surface) 30A of the cover member 30 is bent and formed so as to be brought into surface contact with the connection end surface 8 (protruding step portion 8a, both-side inclined step portions 8b, and upper protruding step portion 8c) of the seat body 1A, and another surface (grip facing surface) 30B is bent and formed so as to be brought into surface contact with the connection end surface 52 (lower end surface 52a, both-side inclined end surfaces 52b, and upper end surface 52c) of the body 50A of the grip.

Before the seat body and the grip are mounted on the rod, the cover member 30 formed as described above is interposed between the connection end surface 8 of the seat body 1A and the grip 50 (connection end surface 52) to integrate them, and in the integrated state, the rod is inserted into the opening holes 1C, 50B and fixed with an adhesive or the like. In this case, even if the cover member 30 and the grip 50 are bonded with an adhesive, the non-transparent cover member 30 prevents the adhesive from being visually recognized through the transparent seat body 1A. Therefore, it is not necessary to form a film that hides the adhesive on the seat body 1A as in the related art. That is, there is no need to apply a masking coating material to the connection end surface 8 of the seat body 1A or to perform a coating film forming step such as plating, and thus, it is possible to reduce a cost and labor of processing. In addition, since such a coating film is not formed, the transparent portion is not reduced and the appearance is not deteriorated, and there is no need to perform post-processing such as correcting or processing the variation of the coating film.

Further, since the connection end surface 8 of the seat body 1A, and the connection end surface 52 of the grip 50 are formed so as to be inclined, a contact area with respect to the cover member 30 is increased, and a fixing force can be improved, and an area of the surface of the cover member that can be visually observed is also increased, and the designability is improved.

In the above configuration, the cover member 30 is fixed to the seat body 1A in advance, and the grip 50 is bonded to the cover member 30 in this state, so that assembling work can be easily performed.

In such a configuration, it is preferable that the connection end surface (seat facing surface) 30A of the cover member 30 and the connection end surface 8 of the seat body 1A are formed with recess-projection engagement portions (concave-convex engagement portions) with which both are immovably fitted. Such recess-projection engagement portions may be formed in a region where both the members abut on each other. In the present embodiment, the recess-projection engagement portions are formed by forming a recessed portion 12 on the surface of a central portion of the protruding step portion 8a of the connection end surface 8 of the seat body 1A, and forming a projected portion 32 fitted in the recessed portion 12 on the connection end surface (seat facing surface) 30A of the cover member 30 (the recess and the projection may be reversed).

According to the recess-projection engagement portions 12, 32, the cover member 30 can be fitted and fixed to the seat body 1A so as not to be movable in the axial direction and a rotational direction, and in this state, the grip 50 is bonded to the cover member 30, by which the assembling work can be easily performed.

In addition, the above-described recess-projection engagement portions are preferably formed along the axial direction. Since the recess-projection engagement portions of both the members extend in the axial direction, the cover member 30 can be inserted into the seat body 1A in the axial direction so as to be fitted to the outer peripheral surface of the exposed protruding portion 1B', and both the members can be integrated as they are. In the integrated state, the cover member 30 can be fixed in a state not moving in the rotational direction, so that both the members can be stably fixed. In this case, it is preferable to form an inclined surface or a restricting surface that makes it easy for the recess-projection engagement portions to relatively move when they are assembled in the axial direction, and makes it hard to come off in the axial direction. This can make the assembly easy and prevent movement in the circumferential direction and in the axial direction after the assembly.

Next, the fitting structure of the floating hood 60 and the nut member 70, and the configuration of the click mechanism 80 will be described.

Figure 3A:
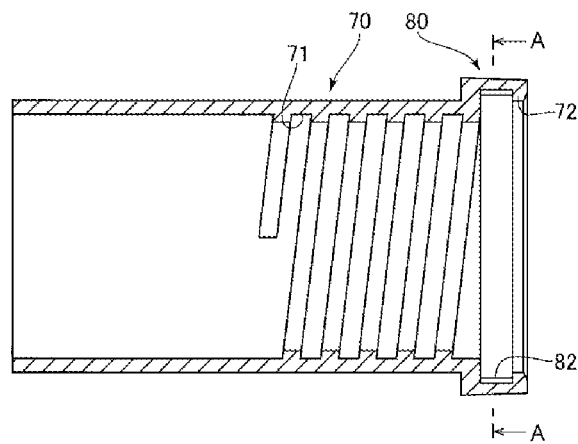
Figure 3B:
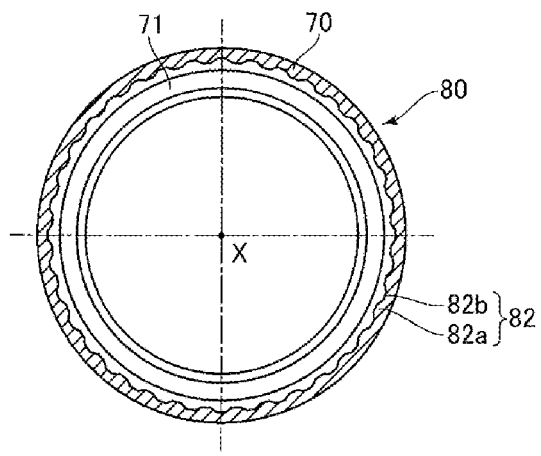
Figure 4A:
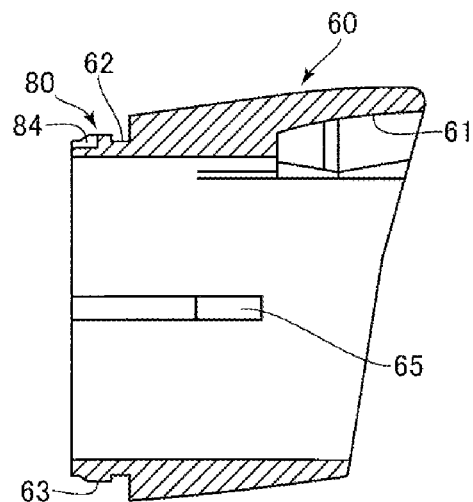
Figure 4B:
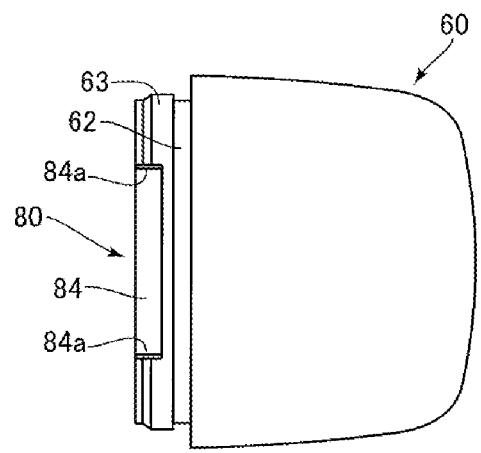
Figure 4C:
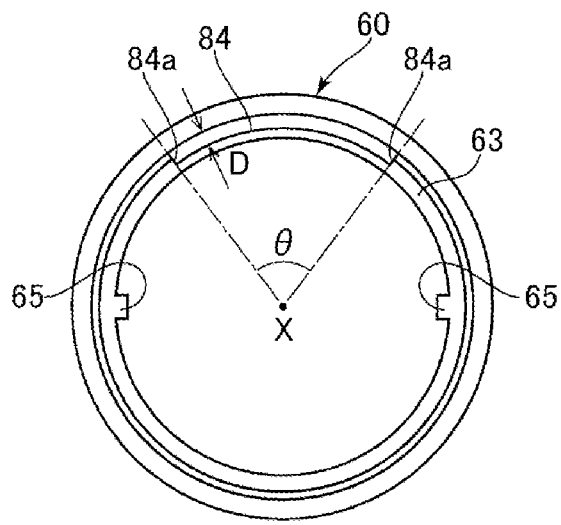

The floating hood 60 and the nut member 70 are fitted to each other at a front end portion of the floating hood 60 and a rear end portion of the nut member 70, and the nut member 70 is externally fitted to a radially outer side of the floating hood 60. As shown in FIG. 3A, the rear end portion of the nut member 70 bulges in the radial direction, and the front end portion of the floating hood 60 shown in FIGS. 4A to 4C is fitted to an inner surface side thereof.

A female screw portion 71 is formed on an inner peripheral surface of the nut member 70, and is screwed with the male screw portion 7 formed at the front end portion of the tubular portion 1B. Therefore, when the nut member 70 is rotationally operated, the nut member 70 moves in the axial direction. In addition, an engagement structure for moving the floating hood 60 integrally with the axial movement of the nut member 70 is provided in the fitting region between the floating hood 60 and the nut member 70. This engagement structure is configured by an engagement relationship between a flange 72 protruding radially inward at a rear end edge of the nut member 70 and a circumferential groove 62 formed on a rear side of a cylindrical protruding portion 63 at a forefront of the floating hood 60.

That is, by fitting the flange 72 of the nut member 70 into the circumferential groove 62 of the floating hood 60, the floating hood 60 is integrally moved in the axial direction together with the nut member 70 even if the nut member 70 moves forward and backward in the axial direction (front-rear direction) by rotationally operating the nut member 70. In this case, even when the nut member 70 is rotationally operated, the floating hood 60 is in a whirl-stopped state by a whirl-stop structure so as not to rotate together. This whirl-stop structure can be configured, for example, by forming protrusions 65 on an inner peripheral surface of the floating hood 60 so as to extend in the axial direction, and forming long grooves 1E on the seat body 1A side so as to extend in the axial direction into which the protrusions 65 enter. According to such a configuration, even if the floating hood 60 tries to rotate together with the nut member 70, the rotation of the floating hood 60 is restricted by the engagement relationship between the protrusions 65 and the long grooves 1E, and the floating hood 60 can move in the axial direction. Such a whirl-stop structure including protrusions and long grooves may be formed at a plurality of places (in the present embodiment, at two points at 180° intervals), or the protrusions may be formed on the seat body 1A side and the long grooves may be formed on the floating hood 60 side.

The click mechanism 80 is provided in the fitting region between the floating hood 60 and the nut member 70, and in the present embodiment, is provided in the fitting region of the portion of the cylindrical protruding portion 63 at the forefront of the floating hood 60 on the front side of the engagement structure (flange 72) that moves the floating hood 60 integrally with the axial movement of the nut member 70. Specifically, the click mechanism 80 includes recess-and-projections (concave-convex portion) 82 that are formed on the inner peripheral surface of the nut member 70 over the circumferential direction and produce click sound, a plate spring 90 that is formed on an outer peripheral surface of the floating hood 60 and includes a top portion 90*a* that engages with recess-and-projections 82, and an arc-shaped recessed portion 84 in which the plate spring 90 is provided (installed).

Figure 5A:
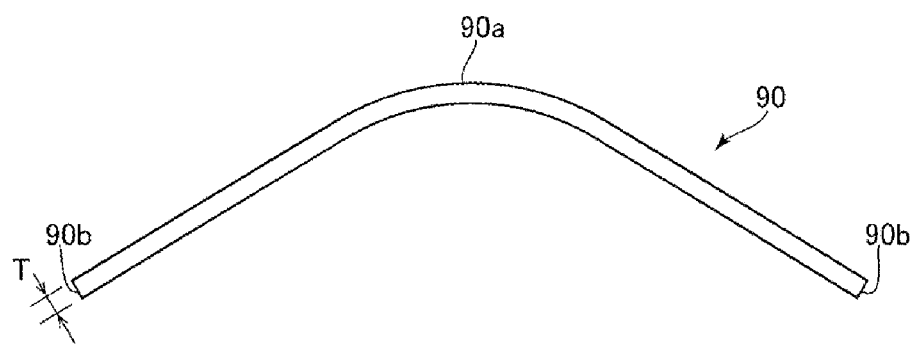
Figure 5B:
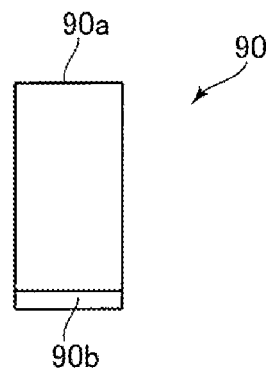

The recessed portion 84 is formed on a surface of the cylindrical protruding portion 63, and as shown in FIGS. 4A, 4B, is disposed adjacent to the hood portion 61 of the floating hood 60 in the axial direction, and is configured to emit sound in the vicinity of the hood portion 61. On the other hand, as shown in FIGS. 5A, 5B, the plate spring 90 is formed in a mountain shape including the top portion 90*a* and both end surfaces 90*b*, and is preferably formed so as to be symmetrical in the right-left direction, and can be installed (placed) inside the recessed portion 84 as it is. That is, the plate spring 90 is not wound around the cylindrical protruding portion 63, but is configured so that both sides of the top portion 90*a* are placed inside the recessed portion 84. For this reason, as to a formation range of the recessed portion 84 (an angle θ of a formation range in the circumferential direction as viewed from the axial direction; see FIG. 4C), the recessed portion 84 is only required to form at an angle of less than 180° about an axial center X. Actually, the recessed portion 84 is only required to have a size that allows the click sound to be effectively produced by a resilient force of the plate spring, and in consideration of the simplification of the structure, weight reduction, workability of incorporation, and the like, a range of 50° to 120° (50° and 120° are included in the range) is sufficient, and further, a range of 60° to 90° (60° and 90° are included in the range) is sufficient. In addition, a material of the plate spring 90 may be formed of a metal material such as aluminum or SUS or a resin material, and a shape thereof can be appropriately deformed.

Further, considering that a depth D of the recessed portion 84 is substantially equal to a wall thickness of a cylindrical protruding portion 63 of a floating hood in a conventional reel seat in which the click mechanism is not disposed, the depth D is preferably formed to be about 0.5 mm to 1.5 mm (0.5 and 1.5 mm are included in the range) so as not to lower a strength. In addition, a thickness T of the plate spring 90 provided (installed) in such a recessed portion having the depth D is preferably 0.15 mm to 0.5 mm (0.15 and 0.5 mm are included in the range).

Figure 6A:
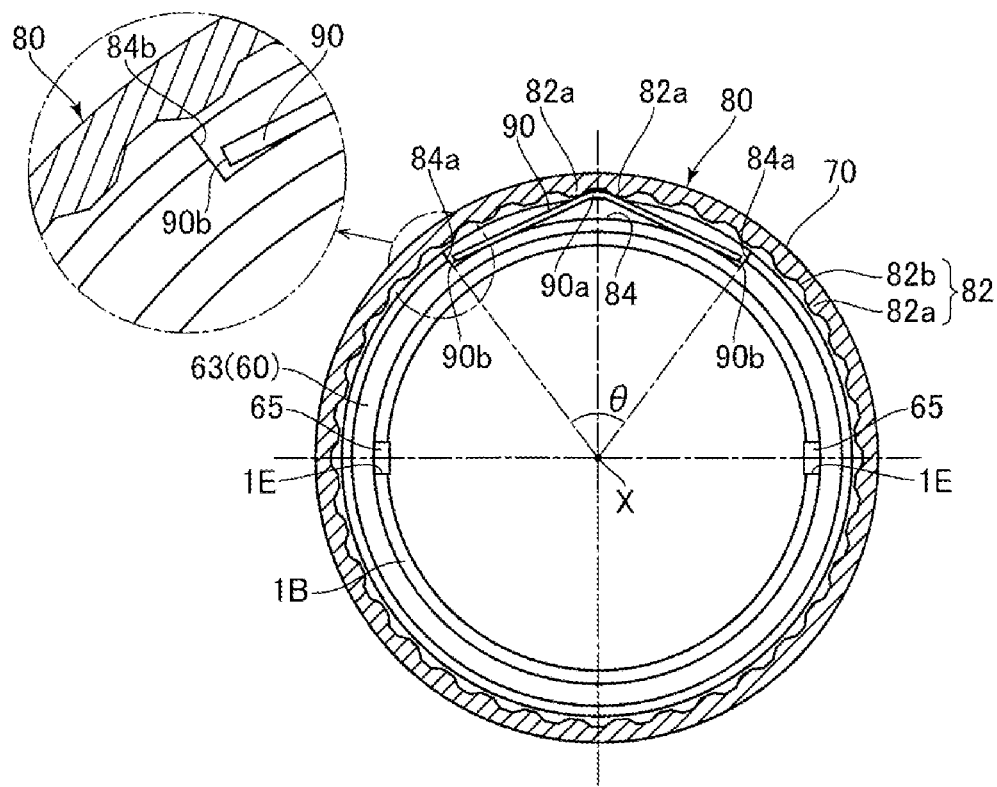

When the nut member 70 is rotationally operated, notifying sound of the click sound by the click mechanism 80 is made by engaging the rotating the recess-and-projections 82 with the top portion 90*a* of the plate spring 90. A formation number of the recess-and-projections 82 formed (number of projections 82*a* and recesses 82*b* formed in a set in the circumferential direction) is not limited, but in the present embodiment, the number of the recess-and-projections is 30 or more in consideration of ease of rotation when the nut member 70 is rotationally operated, a sound production state of the click sound, and the like. In addition, a relationship between the top portion 90*a*, and the recess-and-projections 82 is formed to such an extent that the top portion 90*a* enters one of the recesses 82*b* between the adjacent projections 82*a* as shown in FIG. 6A. Accordingly, when the nut member 70 is rotationally operated, as shown in FIG. 6B, the top portion 90*a* is pressed by each of the projections 82*a*, the plate spring 90 is deformed by about 0.2 mm, and the top portion 90*a* enters between the recess 82*b* by a resilient force, which produces the click sound.

Figure 6B:
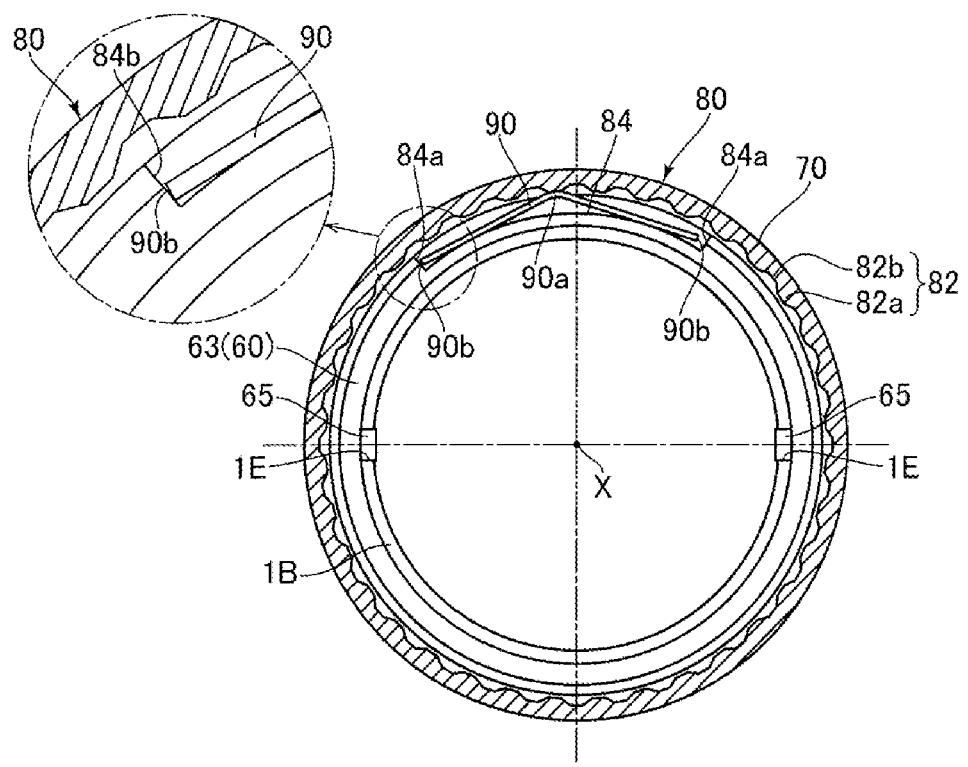

In the above-described configuration of the click mechanism 80, the plate spring 90 and the arc-shaped recessed portion 84 are preferably formed so that a gap is produced between the end surfaces 90*b* of the plate spring 90 and an inner wall 84*a* of the recessed portion as shown in FIGS. 6A, 6B when the plate spring 90 is provided (installed) inside the arc-shaped recessed portion 84.

By forming such a gap, the plate spring 90 can be easily installed, and when the top portion 90*a* is pressed by the projections 82*a* by rotationally operating the nut member 70, the plate spring is easily deformed, and a large resistance does not act on the rotation of the nut member 70. In the case of forming such a gap, when the nut member 70 is rotationally operated and the plate spring 90 is pressed by the resilient engagement between each of the projections 82*a* of the recess-and-projections 82 and the top portion 90*a*, the end surfaces 90*b* (any one of the end surfaces may be used, or both the end surfaces may be used) preferably abut on the inner wall 84*a* of the recessed portion 84. As described above, the end surfaces 90*b* of the plate spring 90 abut on the inner wall 84*a* of the recessed portion 84, so that behavior of the plate spring 90 is stabilized, which can produce stable click sound.

Figure 7A:
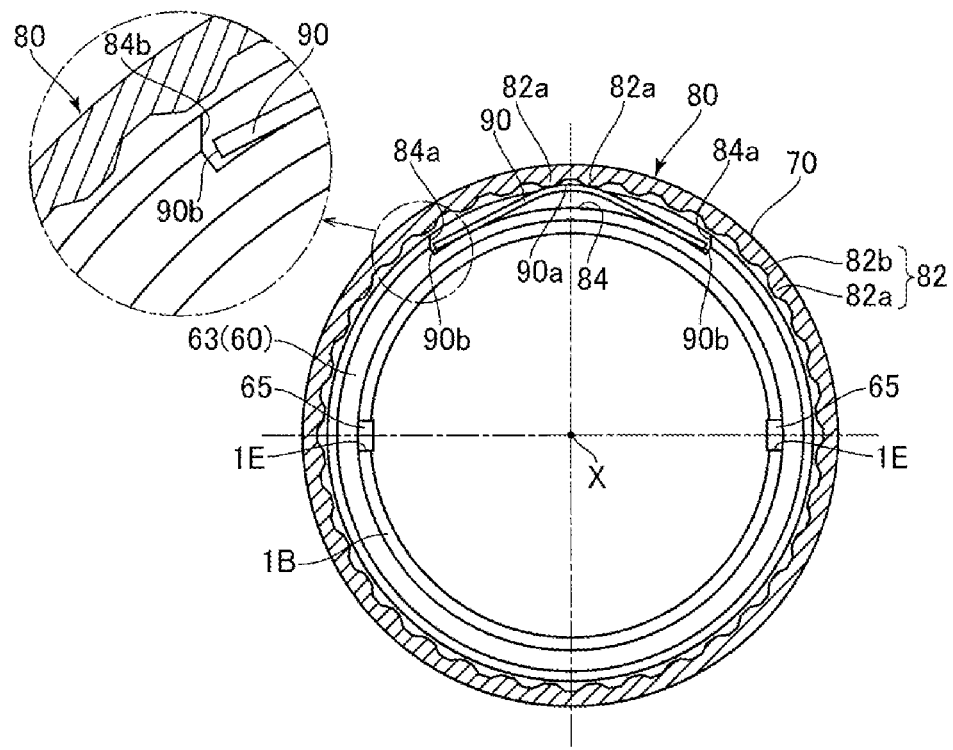
Figure 7B:
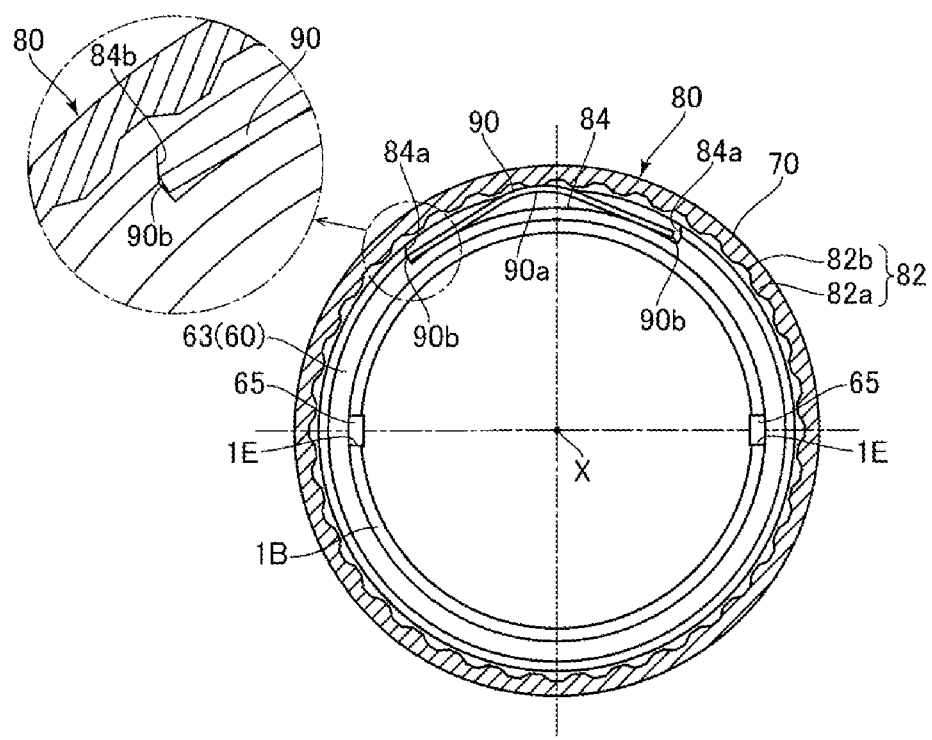

FIGS. 7A and 7B are views showing a modification of the above-described click mechanism 80, in which FIG. 7A is a view showing a state where the top portion of the plate spring is located in the recess by rotating the nut member, and FIG. 7B is a view showing a state where the top portion of the plate spring is engaged with the projection.

In this modification, inclined surfaces 84*b* are formed on the inner wall of the arc-shaped recessed portion 84 so that the plate spring 90 does not come off radially outward when the plate spring 90 is provided (installed) in the recessed portion 84. The inclined surfaces 84*b* are formed so as to fall toward the recessed portion side as it shifts radially outward, and the plate spring 90 provided (installed) inside the recessed portion 84 is in a state restricted from coming off radially outward by the inclined surfaces 84*b*. Since the plate spring 90 is not displaced in the radial direction as described above, when the nut member 70 is rotationally operated, the top portion 90*a* is stably pressed by each of the projections 82*a*, which can produce stable click sound. Also, in such a configuration, similarly to the configuration shown in FIGS. 6A, 6B, it is preferable to form a gap between the end surfaces 90*b* of the plate spring 90 and the inner wall of the recessed portion 84.

As described above, the engagement relationship between the top portion 90*a* of the plate spring 90, and the recess-and-projections 82 (projections 82*a* and the recesses 82*b*) is not limited as long as the click sound is produced during the rotational operation of the nut member 70. However, it is preferable that the top portion 90*a* of the plate spring 90 is formed to have a larger radius of curvature than those of recess and projection surfaces (the top portion 90*a* does not enter the recess 82*b*, and the adjacent projections 82*a* press the top portion 90*a*). With this configuration, resistance during the rotational operation of the nut member 70 is reduced, and rotational operability can be improved.

The click mechanism 80 of the reel seat as described above has a simple structure in which the arc-shaped recessed portion 84 is formed in the outer peripheral surface (the cylindrical protruding portion 63 at the forefront) of the floating hood 60 and the plate spring 90 is provided (installed) in that portion, and thus it is not necessary to separately provide a support member for the spring member as in the related art. In addition, since the configuration is such that the click sound is produced by the resiliency (resilient force in the up-down direction) of the plate spring 90 provided (installed) in the recessed portion 84, the structure is simplified, and outer diameters of the floating hood and the nut member are not increased.

While the embodiment of the present disclosure has been described above, the present disclosure is not limited to the above-described embodiment and can be variously modified.

While the above-described click mechanism 80 is formed adjacent to the hood portion 61 of the floating hood 60 in the axial direction, a position where the click mechanism is formed is not limited. In addition, since the click mechanism 80 has a simple structure in which the recessed portion 84 is simply formed in the fitting region of the floating hood 60, the outer diameters of the floating hood and the nut member are not increased even if the click mechanisms are formed at a plurality of places along the circumferential direction. Further, a material for forming the seat body 1A is not limited, and a surface shape of the seat body 1A can be variously modified, for example, by forming irregularities, lightening portions, openings or the like. In addition, a grip or the like may be attached to a surface of the nut member 70 described above. In addition, the floating hood 60 may be disposed on the rear side of the seat body 1A or the floating hoods may be provided on both sides. Furthermore, while the reel seat of the present embodiment has the structure in which the spinning reel is mounted, the real seat may be of a type in which a double bearing reel is mounted, and in such a seat body, a trigger may be formed on the side opposite to the reel leg placing portion.

What is claimed is:

1. A reel seat comprising:
   a seat body including a reel leg placing portion on which a reel leg of a fishing reel is placed, and
   a tubular portion with an opening hole that a rear end portion of a rod is fitted in and fixed to, wherein
   the seat body includes a floating hood that moves in an axial direction and fixes the reel leg placed on the reel leg placing portion, a nut member that is fitted in the floating hood so as to move the floating hood in the axial direction in a state where the floating hood is whirl-stopped, and a click mechanism in a fitting region between the floating hood and the nut member,
   the click mechanism includes a recess-and-projection on an inner peripheral surface of the nut member and configured to produce a click sound, and a recessed portion that has an arc shape and is on an outer peripheral surface of the floating hood,
   a plate spring having a top portion engaged with the recess-and-projection is on the recessed portion, and
   an inclined surface is on a portion of an inner surface of an inner wall of the recessed portion and configured to radially overlap with an end surface of the plate spring furthest away from the top portion to retain the end surface in the recessed portion, wherein
   the plate spring and the recessed portion are configured so that a gap is formed in a circumferential direction between the end surface of the plate spring and the inner wall of the recessed portion when the plate spring is inside the recessed portion,
   when the nut member is rotationally operated, the plate spring is pressed by resilient engagement between the recess-and-projection and the top portion, and the end surface of the plate spring abuts on the inner wall of the recessed portion, and
   the end surface is along a thickness direction of the plate spring and furthest away from the top portion.

2. The reel seat according to claim 1, wherein the top portion of the plate spring has a larger radius of curvature than radiuses of curvature of surfaces of the recess-and-projection of the nut member.

3. The reel seat according to claim 1, wherein the plate spring has a thickness of 0.15 mm to 0.5 mm, a circumferential range of the recessed portion is 50° to 120°, and a depth of the recessed portion is 0.5 mm to 1.5 mm.

4. A fishing rod, wherein the reel seat according to claim 1 is fixed to the fishing rod.

5. The reel seat according to claim 1, wherein
   the plate spring has two opposed straight ends, one of which includes the end surface, that extend from the top portion, and
   the plate spring is bent at the top portion.

6. The reel seat according to claim 1, wherein
   the plate spring has two opposed straight ends that extend from the top portion,
   one of the two opposed straight ends includes the end surface of the plate spring, and
   the plate spring is bent at the top portion.

7. The reel seat according to claim 1, wherein
   the plate spring having the top portion engaged with the recess-and-projection is on and radially outward of a bottom surface of the recessed portion.

* * * * *